Feb. 5, 1929.

H. C. HOWER 1,701,482

TIRE TREAD

Filed July 16, 1928    2 Sheets-Sheet 1

Inventor
Harry C. Hower.
By Brown Jackson Boettcher & Dienner
Attys.

Feb. 5, 1929. 1,701,482
H. C. HOWER
TIRE TREAD
Filed July 16, 1928 2 Sheets-Sheet 2
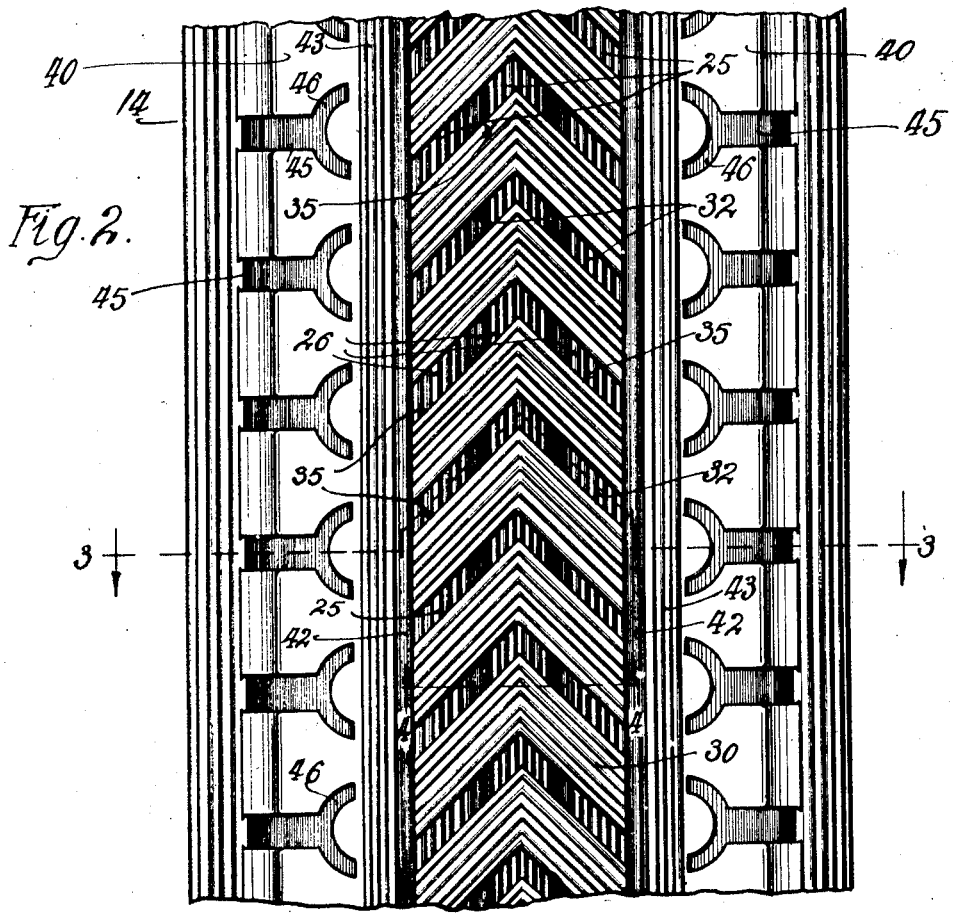
Fig. 2.
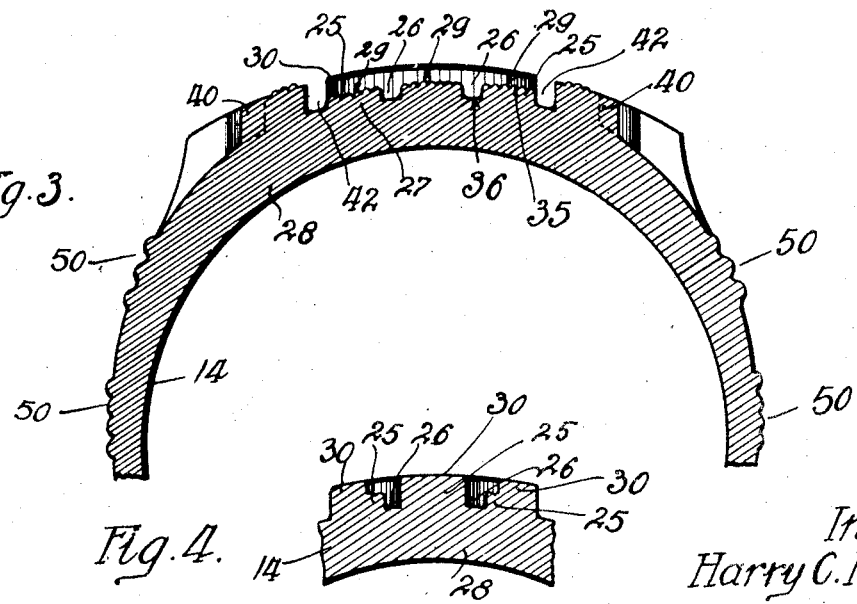
Fig. 3.
Fig. 4.
Inventor
Harry C. Hower.
By Brown Jackson Boettcher Tanner
Attys.

Patented Feb. 5, 1929.

1,701,482

UNITED STATES PATENT OFFICE.

HARRY C. HOWER, OF CHICAGO, ILLINOIS.

TIRE TREAD.

Application filed July 16, 1928. Serial No. 293,144.

This invention relates to tire treads and more particularly to anti-skid treads for pneumatic tires.

While the tread of the present invention is particularly adapted for use on low pressure or "balloon" tires, it is to be understood that the invention is not limited to a particular use but may be employed with other tire constructions as suitable or desired.

With the present day tendency toward higher speeds and smaller wheels the tread wear is increased and the life of the tread is reduced. The matter of increasing the life of the tread without decreasing its initial strength or its initial resistance to wear and distortion has presented a difficult problem.

Where it is attempted to do this by simply increasing the depth or radial dimensions of the tread projections the greater unsupported height of these projections decreases their strength and resistance to the driving and braking stresses at least during the initial operation or at least until the tread has worn down until the unbraced projection is not so great.

The object of the present invention is to increase the life of the tread and to provide a generally improved and simplified tread construction, having a more uniform strength and a more uniform tread action over its increased life.

To these ends the invention provides a double or multiple tread in which the outer tread projections overlie and submerge the inner tread projections. The inner tread projections serve the dual purpose of providing a tread and particularly an anti-skid tread action after the outer tread is worn off and they support and brace the outer tread during the life thereof in a manner which provides good initial strength and resistance to road wear and to the driving and braking stresses.

The inner or submerged tread is preferably of a different pattern than the outer tread, or at least is preferably so disposed that it will brace and strengthen the outer tread in a manner which would not be accomplished simply by a single tread of increased depth or radial dimension. The base of the outer tread projections may extend inwardly to where the base of the inner or submerged tread projections are joined to the tread body or body or carcass of the tire, in which case the bases or inner ends of the outer tread projections will, when the outer tread is worn off, coact with the inner tread projections to supplement or complete the inner anti-skid tread pattern.

In addition to the above improvement, I provide a novel outer tread pattern presenting uniform rubber or tread material to the road at all times as well as a novel inner and outer tread pattern combination and an inner tread pattern which is supplemented or completed by the base of the outer tread pattern when the outer tread wears off.

Among the advantages of the invention may be enumerated increasing the life of the tread and increasing the resistance of the tread to wear and distortion over this increased life as well as more effectively distributing the driving and braking stresses through the tread.

The invention is illustrated in the accompanying drawings, in which:

Fig. 2 is a fragmentary plan view of the tread of a small portion of the tire;

Fig. 3 is a fragmentary cross-section taken on the line 3—3 of Fig. 2;

Fig. 4 is a fragmentary detail cross-section taken on the line 4—4 of Fig. 2.

Figure 1:
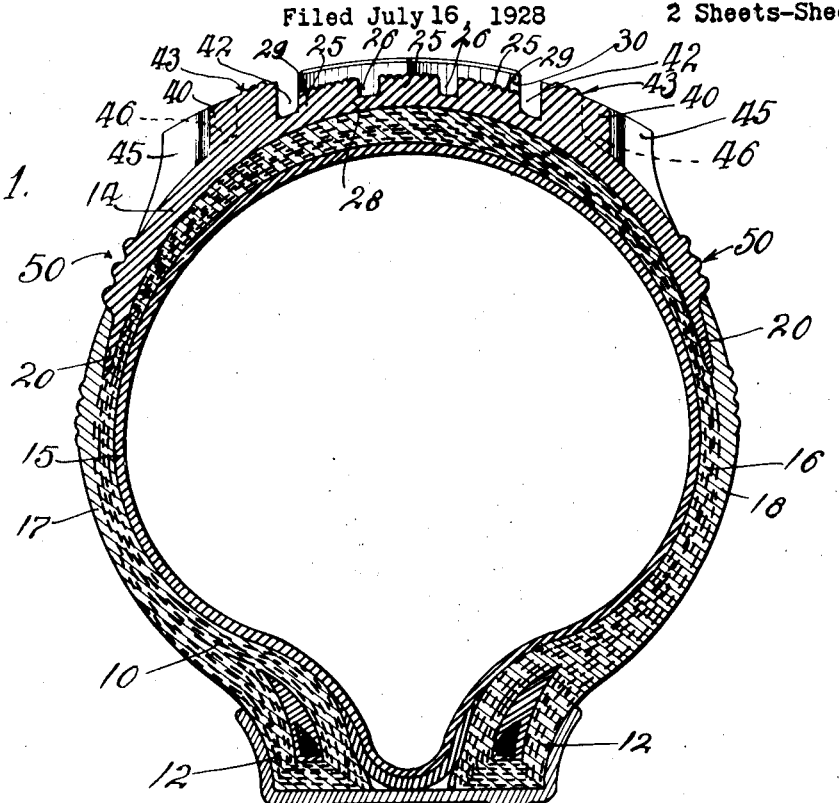
Fig. 1 is a cross-sectional view of a tire embodying the present invention.

Referring to the drawings, the tire shown in Fig. 1 comprises any existing or preferred carcass or body indicated generally at 10. The carcass 10 which is usually of rubber and textile or fabric construction, has beads 12 and a tread designated generally at 14. The beads 12 may be of any suitable or preferred construction and the construction of the tread with which the present invention is particularly concerned will be described in detail presently.

The opposite side walls of the tire are indicated at 15 and 16 and the outer surfaces of these side walls 15 and 16 may be formed by flanking strips suitably secured over and covering the sides of the tire at 17 and 18. The outer ends of the flanking strips 17 and 18 are shown as overlapping the opposite circumferential margins 20 of the tread 14 but this may all be varied as desired.

Referring now to the particular design or pattern of tread illustrated, a plurality of narrow, continuous central ribs 25 extend in ring-like form about the full circumference of the tread. These tread ribs 25 are separated at 26 and although three ribs are shown, it is understood that the particular number of ribs may be varied widely. The tread ribs 25 are disposed centrally and their bases 27 are formed integral with or suitably joined to the body 28 of the tread 14. The outer surfaces of the tread ribs 25 may be corrugated, beaded or fluted at 29.

Overlying and submerging the inner tread ribs 25 are a series of circumferentially spaced tread projections or tread blocks 30. The tread members 30 are arranged generally transversely with respect to the tread ribs 25 and these tread members or ribs 30 are shown as of angular or generally V-shaped configuration.

The spaces between the ribs 30 are indicated at 32 and the spacing and configuration of these tread members or ribs 30 is preferably such as to present the same amount of rubber or tread material to the road in all positions of the wheel. That is, a line normal to the planes of the tread ribs 25 will pass through the same amount of rubber or material of the tread members 30 in any position about the tire. The outer surfaces of the tread ribs or members 30 are preferably beaded, corrugated or fluted. Where the tread members 30 overlie the tread ribs 25, their bases are joined or formed integral at 35 with the ribs 25 and in the spaces 26 the bases of the ribs 30 preferably extend down to the body 28 and are joined or formed integral therewith at 36 along the bases 27 of the ribs 25.

The result of this tread construction is a double or multiple tread in which the inner or submerged tread ribs 25 perform the dual purpose of strengthening and reinforcing the bases of the outer tread members 30 and when the outer tread members 30 are worn off the inner or submerged tread ribs 25 are exposed for antiskid action with the ground thus materially increasing the life of the tread without impairing the initial tread action. The disposition of the inner tread ribs 25 across the outer V-shaped tread members 30 materially increases the strength and wear-resisting properties of the outer tread members 30 over what would be obtained by merely increasing the height or depth of the outer tread members 30.

Figure 5:
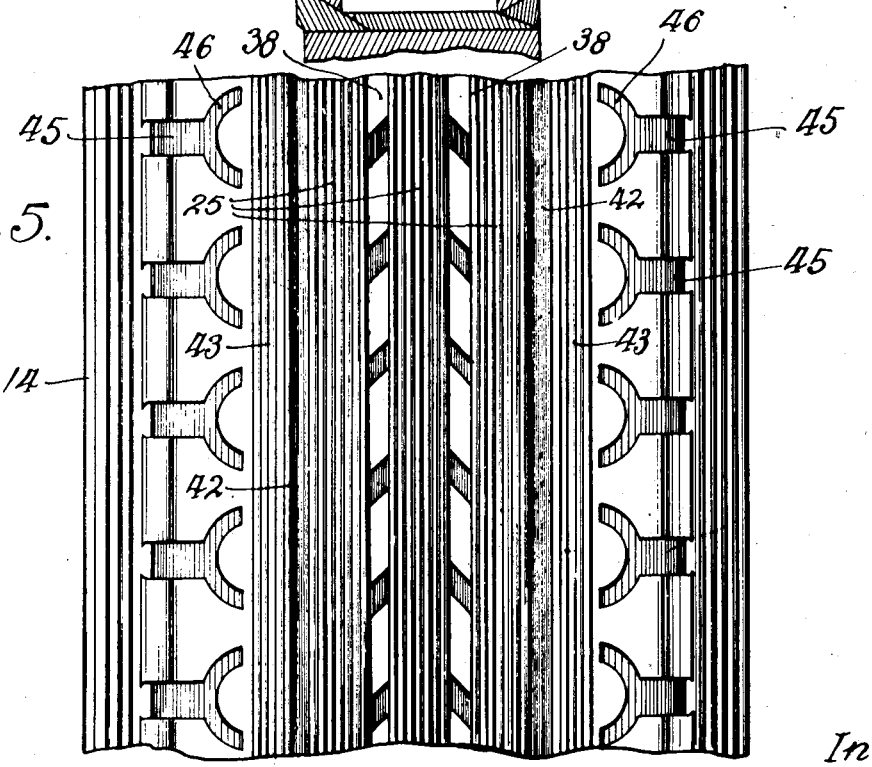
Fig. 5 is a view similar to Fig. 2 showing how the inner or submerged tread is exposed for action after the outer tread is worn off.

The different pattern of the inner tread takes the cross stresses on the outer tread and provides a support for the outer tread outwardly beyond the base thereof. When the outer tread is worn off, the inner tread comes into action, as shown in Fig. 5, and the bases of the outer tread extending through the spaces between the inner tread ribs 25 may supplement or complete the inner tread pattern, as shown at 38 in Fig. 5. This provides a strong and effective inner tread and the tread action over its entire life is substantially uniform.

The important aspect of the present invention is an improved multiple tread, and, in a more specific sense, a multiple tread in which the tread portions are of different patterns disposed and arranged to more effectively brace and strengthen one by the other.

Outside the central tread belt the tread shown has circumferential tread projections 40 one on each side of the central tread belt and each spaced from the central tread belt at 42. The outer surfaces of the tread projections 40 may be circumferentially ribbed, corrugated or fluted at 43 and the side tread projections 40 may be broken up or divided by transverse grooves or spaces 45 shown as terminating in the ends disposed toward the central tread belt in semi-circular spaces or grooves 46.

The life of the tread is increased and the operation and construction is improved.

The particular tire shown is a low pressure or "balloon" tire having a carcass of greater flexibility than the carcass of a high pressure tire for the same loads and adapted to carry a predetermined load at an inflation pressure substantially reduced below that of a high pressure tire for the same load said tire being substantially increased in cross-sectional area and decreased in ratio of wall thickness to cross-sectional area with respect to a high pressure tire for the same load, but, as already pointed out, the particular construction of the tire may be varied widely.

Where I use the term generally transverse ribs, in the appended claims, I intend that term to include the V-shaped cross rib configurations shown, as well as any variations coming under this term, and where I refer to termination of the ends of the cross ribs coincident with the outer circumferential edges of the outer circumferential ribs, I intend to include any substantial coincidence as might be employed with the same results.

I claim:

1. A tire having a tread comprising an outer portion composed of a plurality of outer spaced tread projections and an inner tread portion composed of a plurality of inner spaced tread projections underlying said outer tread projections and exposed for presentation to the road only after said outer tread projections are worn off, the inner tread projections comprising projecting ribs extending circumferentially and spaced transversely and each of substantially uniform thickness throughout, and the tread projections of the outer tread portion comprising generally transverse cross ribs each continuous generally transversely across the entire group of inner circumferential tread ribs and each of substantially uniform thickness throughout, the ends of said outer cross ribs terminating coincident with the outer circumferential edges of the outermost of the inner circumferential tread ribs.

2. A tire having a tread comprising an outer tread portion composed of a plurality of outer tread projections and an inner tread portion composed of a plurality of inner tread projections underlying said outer tread projections and exposed for presentation to the road only after said outer tread projections are worn off, the tread projections of one of said tread portions comprising projecting ribs extending circumferentially and spaced transversely and each of substantially uniform thickness throughout, and the tread projections of the other tread portion comprising generally transverse cross ribs each affording in operation a tread surface continuous generally transversely across the entire group of circumferential tread ribs of the other tread portion, and each of substantially uniform thickness throughout, the ends of the cross ribs terminating coincident with the outer circumferential edges of the outermost circumferential tread ribs.

In witness whereof, I hereunto subscribe my hand this 10th day of July, 1928.

HARRY C. HOWER.